United States Patent
Ha et al.

(10) Patent No.: US 11,540,126 B2
(45) Date of Patent: Dec. 27, 2022

(54) MOVING OBJECT SHARING METHOD AND APPARATUS USING EDGE COMPUTING IN FLEET SYSTEM

(71) Applicants: HYUNDAI MOTOR COMPANY, Seoul (KR); KIA MOTORS CORPORATION, Seoul (KR)

(72) Inventors: Jae Jun Ha, Hwaseong-si (KR); Young Jun Moon, Sejong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 336 days.

(21) Appl. No.: 16/823,746

(22) Filed: Mar. 19, 2020

(65) Prior Publication Data

US 2020/0320717 A1 Oct. 8, 2020

(30) Foreign Application Priority Data

Apr. 3, 2019 (KR) .................. 10-2019-0039134

(51) Int. Cl.
| | |
|---|---|
| G06T 7/20 | (2017.01) |
| H04W 12/06 | (2021.01) |
| H04L 9/32 | (2006.01) |
| H04W 4/40 | (2018.01) |
| G07F 17/00 | (2006.01) |
| H04W 4/021 | (2018.01) |
| H04W 4/029 | (2018.01) |
| H04W 4/35 | (2018.01) |

(Continued)

(52) U.S. Cl.
CPC ............ *H04W 12/06* (2013.01); *G06Q 50/30* (2013.01); *G06T 7/20* (2013.01); *G07F 17/0042* (2013.01); *G07F 17/0057* (2013.01); *H04L 9/3239* (2013.01); *H04W 4/021* (2013.01); *H04W 4/029* (2018.02); *H04W 4/35* (2018.02); *H04W 4/40* (2018.02); *H04W 4/44* (2018.02); *G06T 2207/30252* (2013.01); *H04W 4/023* (2013.01)

(58) Field of Classification Search
CPC ..... H04W 12/06; H04W 4/021; H04W 4/029; H04W 4/35; H04W 4/40; H04W 4/44; H04W 4/023; G06Q 50/30; G06T 7/20; G06T 2207/30252; G07F 17/0042; G07F 17/0057; H04L 9/3239; H04L 2209/38; H04L 2209/84
See application file for complete search history.

(56) References Cited

U.S. PATENT DOCUMENTS

| | | | |
|---|---|---|---|
| 2011/0213629 A1* | 9/2011 | Clark | ................ G06Q 30/0641 705/5 |
| 2017/0132534 A1 | 5/2017 | Darnell et al. | |
| 2018/0059913 A1* | 3/2018 | Penilla | ................ G06F 3/04842 |

FOREIGN PATENT DOCUMENTS

| | | |
|---|---|---|
| CN | 106128138 A | 11/2016 |
| CN | 107563846 A | 1/2018 |

(Continued)

*Primary Examiner* — An T Nguyen
(74) *Attorney, Agent, or Firm* — Fox Rothschild LLP

(57) ABSTRACT

A moving object sharing service in a fleet system is provided. In a fleet system providing a moving object sharing service, the device searches for an available moving object, performs authentication for the moving object searched, and controls the moving object when the authentication is completed; and the authentication for the moving object is performed through the moving object and first nodes located within a predetermined range from the moving object.

20 Claims, 13 Drawing Sheets

(51) Int. Cl.
  *H04W 4/44*   (2018.01)
  *G06Q 50/30*  (2012.01)
  *H04W 4/02*   (2018.01)

(56) References Cited

FOREIGN PATENT DOCUMENTS

| | | |
|---|---|---|
| CN | 108632820 A | 10/2018 |
| CN | 108701412 A | 10/2018 |
| CN | 108985902 A | 12/2018 |
| WO | WO 2019/021020 A1 | 1/2019 |

* cited by examiner

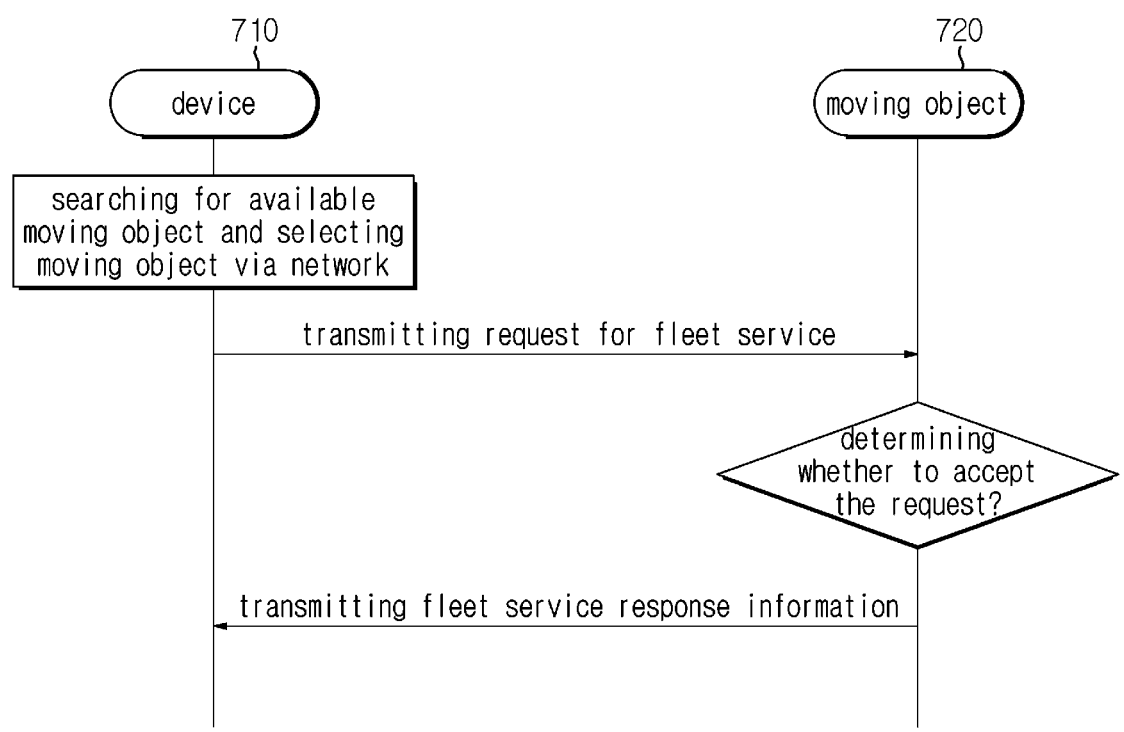

MOVING OBJECT SHARING METHOD AND APPARATUS USING EDGE COMPUTING IN FLEET SYSTEM

CROSS-REFERENCE TO RELATED APPLICATION

The present application claims priority to and the benefit of Korean Patent Application No. 10-2019-0039134, filed on Apr. 3, 2019, which is incorporated herein by reference in its entirety.

TECHNICAL FIELD

The present disclosure relates to a moving object sharing method and apparatus using edge computing in a fleet system.

BACKGROUND

The statements in this section merely provide background information related to the present disclosure and may not constitute prior art.

As technology advances, the concept of vehicle ownership is weakening, and the use of shared vehicles is increasing. Specifically, there is an increased need to share a vehicle, like car sharing or carpool, but the existing vehicle sharing system does not reflect various styles of individual users. Accordingly, there is a need for a system customized to a user.

In addition, there is an increased need to share a vehicle and provide the service for a convenience of living in a specific area or residence. However, in the case of sharing a vehicle, the satisfaction level of the service is not high yet compared to the privately owned vehicle, and it is difficult to provide vehicle security and service because the vehicle sharing system is not properly installed in the vehicle. Hereinafter, in consideration of the foregoing, it is necessary to provide a vehicle fleet system.

In addition, vehicles have evolved into various types of moving means as moving objects, unlike vehicles in the related art, and the present disclosure will be described below with reference to moving objects.

SUMMARY

The present disclosure can provide a moving object sharing method and apparatus using edge computing in a fleet system.

The present disclosure can provide a method and apparatus for searching for a shared moving object using edge computing in a fleet system.

The present disclosure can provide a method and apparatus for performing identification and authentication for a shared moving object using edge computing in a fleet system.

In some forms of the present disclosure, a method of providing a moving object sharing service in a fleet system, the method including: searching for an available moving object by a device; performing authentication for the moving object found by the device; and controlling the moving object by the device when the authentication is completed, wherein the authentication for the moving object is performed through the moving object and first nodes located within a predetermined range from the moving object.

In addition, in some forms of the present disclosure, a device for providing a moving object sharing service in a fleet system, the device including a transceiver transmitting and receiving a signal; and a processor controlling the transceiver, wherein the processor searches for an available moving object, performs authentication for the moving object found, and controls the moving object when the authentication is completed; and the authentication for the moving object is performed through the moving object and first nodes located within a predetermined range from the moving object.

In addition, in some forms of the present disclosure, a fleet system for providing a moving object sharing service, the system including: a plurality of devices registered in the fleet system; and a plurality of moving objects registered in the fleet system, wherein a first device of the plurality of devices searches for an available moving object among the plurality of moving objects; the device performs authentication for the moving object found; when the authentication is completed, the moving object is controlled by the device; and the authentication of the moving object is performed through the moving object and first nodes located within a predetermined range in the moving object.

In addition, in some forms of the present disclosure, the fleet system further includes a server, the plurality of devices and the plurality of moving objects may be registered and managed by the server.

In addition, in some forms of the present disclosure, a moving object for providing a moving object sharing service in a fleet system, the moving object including: a transceiver transmitting and receiving a signal; and a processor controlling the transceiver, wherein the processor receives a fleet request message, performs authentication for the device on the basis of the received fleet request message, and controls the moving object when the authentication is completed; and the authentication for the moving object is performed through the moving object and first nodes located within a predetermined range from the moving object.

In addition, the following items may be commonly applied to a sharing service providing method, a moving object, a device, and a system.

In addition, in some forms of the present disclosure, when the moving object and the first nodes perform data exchange, the moving object and the first nodes may perform the data exchange through a first frame format on the basis of a first type protocol.

In addition, in some forms of the present disclosure, the device and the moving object may perform the data exchange with a cloud included in the fleet system, and when the device and the moving object perform the data exchange with the cloud, the data exchange may be performed through a second frame format on the basis of a second type protocol.

In addition, in some forms of the present disclosure, at least one of identification information, authentication information, and real-time processing information may be exchanged between the moving object and the first nodes on the basis of the first type protocol.

In addition, in some forms of the present disclosure, when the cloud is not included in the fleet system, and the first type protocol and the first frame format may be preset to the device, the moving object, and the first nodes.

In addition, in some forms of the present disclosure, at least one of the identification information, the authentication information, and the real-time processing information may be exchanged between the moving object and the first nodes on the basis of the first type protocol, and history information may be stored in at least one of the moving object and the device.

In addition, in some forms of the present disclosure, the moving object and the first nodes may share fleet authentication ledger information, and the authentication for the moving object may be performed on the basis of the fleet authentication ledger information.

In addition, in some forms of the present disclosure, the moving object may receive a fleet request message from the device and perform the authentication on the basis of the fleet request message.

In addition, in some forms of the present disclosure, when the authentication for the moving object is performed, the moving object may generate authentication information on the basis of the received fleet request message, transmit the generated authentication information to the first nodes, and receive first hash values from each of the first nodes, in which each of the hash values is generated by the first nodes on the basis of the authentication information.

In addition, in some forms of the present disclosure, when the device searches for the available moving object, the moving object may set a sharing condition, and the device may search for the available moving object on the basis of the set sharing condition.

In addition, in some forms of the present disclosure, the sharing condition may be set on the basis of at least one of use time information, movable area information, source information, and destination information of the moving object.

In addition, in some forms of the present disclosure, the device may transmit a fleet service request message including the sharing condition information to second nodes located within the predetermined range in the device; the second nodes each may generate a second hash value on the basis of the fleet service request message; and when the authentication is completed on the basis of the second hash value, a candidate group list that satisfies the sharing condition information may be provided to the device.

In addition, in some forms of the present disclosure, the predetermined range may be set to a coverage of a base station in which the moving object in included.

In addition, in some forms of the present disclosure, the nodes located within the predetermined range may be at least one of devices and moving objects registered in the fleet system.

In addition, in some forms of the present disclosure, when the device searches for the available moving object, the moving object may set a sharing condition, and the device may search for the available moving object on the basis of the set sharing condition.

In addition, in some forms of the present disclosure, the sharing condition may be set on the basis of at least one of use time information, movable area information, source information, and destination information of the moving object.

In addition, in some forms of the present disclosure, the processor may transmit a fleet service request message including sharing condition information to second nodes located within a predetermined range in the device; the second nodes each may generate a second hash value on the basis of the fleet service request message; and when the authentication is completed on the basis of the second hash value, a candidate group list that satisfies the sharing condition information may be provided to the device.

In addition, in some forms of the present disclosure, the device and the second nodes may share fleet search ledger information on the basis of the fleet system; and the second nodes may generate the second hash value on the basis of the fleet search ledger information.

In some forms of the present disclosure, it is possible to share a moving object using edge computing in a fleet system.

In some forms of the present disclosure, it is possible to search for a shared moving object using edge computing in a fleet system.

In some forms of the present disclosure, it is possible to perform identification and authentication for a shared moving object using edge computing in a fleet system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 7 is a diagram illustrating a method of providing a fleet service using edge computing;

Figure 1:
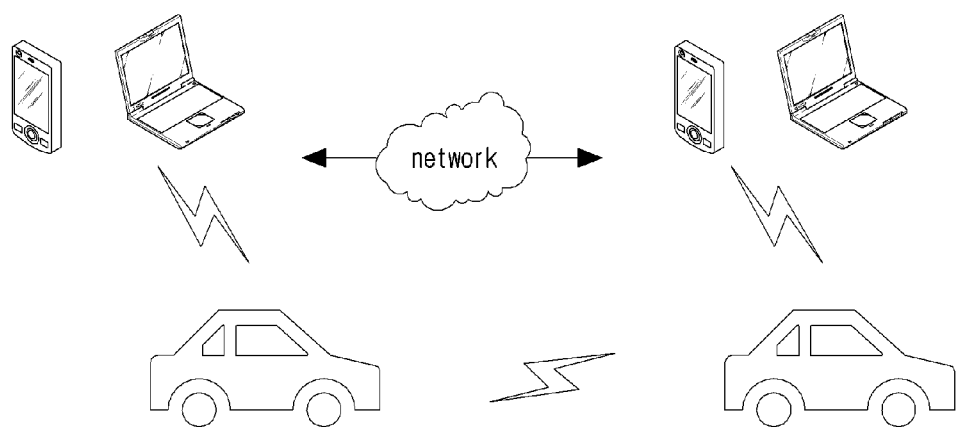
FIG. 1 is a diagram illustrating a method in which a moving object communicates with another device through a network.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In some forms of the present disclosure, a detailed description of known functions and configurations incorporated herein will be omitted when it may make the subject matter of the present disclosure rather unclear. Parts not related to the description of the present disclosure in the drawings are omitted, and similar parts are denoted by similar reference numerals.

In some forms of the present disclosure, when a component is "connected", "coupled", or "fixed" to another component, it means that the component is not only directly connected to the another component, but also the component is indirectly connected to the another component with other components in between. In addition, when a component "includes" or "has" another component, it means that the component may further include another component without excluding other components, unless specifically stated otherwise.

In some forms of the present disclosure, terms such as first and second are used only for the purpose of distinguishing one component from other components, and do not limit the order or importance between the components unless specifically mentioned. Accordingly, within the scope of the present disclosure, a first component in one form of the present disclosure may be referred to as a second component in another form of the present disclosure, and likewise, a second component in one form of the present disclosure may be referred to as a first component in another form of the present disclosure.

In some forms of the present disclosure, the components distinguished from each other are for clearly describing each feature, and do not necessarily mean that the components are separated. That is, a plurality of components may be integrated into one hardware or software unit, or one component may be distributed and formed into a plurality of hardware or software units. Therefore, even if not mentioned otherwise, such integrated or distributed forms of the present disclosure are included in the scope of the present disclosure.

Advantages and features of the present disclosure, and methods for achieving them will be apparent with reference to the some forms of the present disclosure described below in detail with reference to the accompanying drawings.

FIG. 1 is a diagram illustrating a method in which a moving object communicates with other moving objects or devices through a network. Referring to FIG. 1, a moving object may communicate with other moving objects or other devices. Herein, as an example, the moving object may communicate with other moving objects or other devices, based on cellular communication, WAVE communication, dedicated short range communication (DSRC), or another communication scheme. That is, as the cellular communication network, a communication network such as LTE, 5G, WiFi communication network, WAVE communication network, etc. may be used. In addition, a local area network used in a moving object such as DSRC may be used, but the present disclosure is not limited thereto. The moving object may have equipment capable of performing communication, and communicate with another device on the basis of the equipment.

In addition, for example, with respect to the communication of a moving object, a module capable of communication with only a device located inside the moving object and a module capable of communication with a device outside the moving object may be separated from each other for the security of the moving object. For example, inside a moving object, communication may be performed on the basis of security only for a device within a certain range of the moving object, such as Wi-Fi communication. For example, a moving object and a moving object driver's personal device may include a communication module for performing only communication with each other. That is, the moving object and the moving object driver's personal device may use a communication network that is blocked from an external communication network, and also use an in vehicle network. In addition, as an example, the moving object may include a communication module for performing communication with an external device. Accordingly, the moving object may receive necessary information from the outside and operate on the basis of the fleet system.

Figure 2:
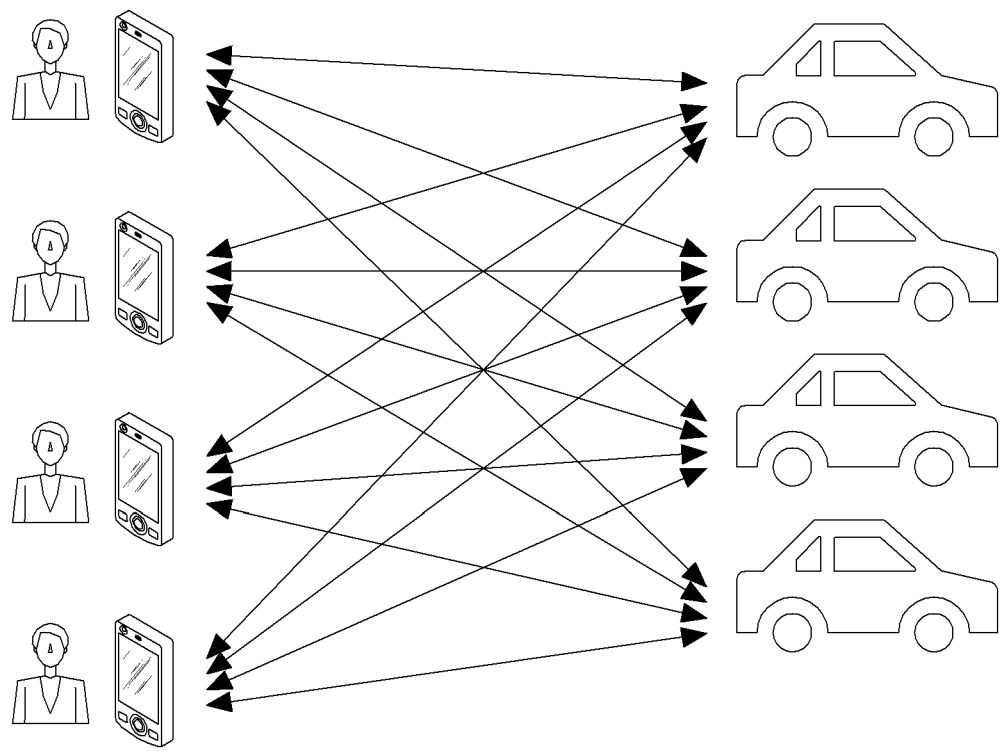
FIG. 2 is a diagram illustrating a method of sharing a moving object through a fleet system.

In addition, FIG. 2 illustrates a method of providing the moving object sharing service through a fleet system. For example, the fleet system may be applied to provide the moving object sharing service. Herein, the fleet system may be a system including a plurality of devices and a plurality of moving objects. Herein, each of the plurality of moving objects may be owned by a specific owner. That is, there is a separate owner for each of a plurality of moving objects, and other users are allowed to use the moving object through the fleet system. For example, a separate owner device may correspond to each of the plurality of moving objects. That is, each moving object has a device corresponding to the owner. In addition, as an example, there is a device for each user using each moving object. Herein, the users may use the moving object on the basis of each device. Hereinafter, for convenience of description, a device for an owner is referred to as an owner device, and a device for a user is referred to as a tenant device. However, this is merely an example for convenience of description and some forms of the present disclosure are not limited thereto. In addition, for example, the owner device and the tenant device may be smart devices. In addition, the owner device and the tenant device may be devices such as a smart watch or other decoration worn on a person. As another example, the owner device and the tenant device may be SIM cards. For example, the SIM card may be included in a portable device. As another example, the owner device and the tenant device may be separate devices for the fleet system. That is, the owner device and tenant device may be devices for recognizing the moving object, and some forms of the present disclosure are not limited thereto.

In addition, as an example, the moving object may be a vehicle. In addition, as an example, the moving object may be an object that moves over equipment such as rail track. As another example, the vehicle may be a flying object such as a drone. That is, the moving object may refer to a movable object, and may mean a moving object shared through the fleet system. However, the following is described with respect to a car for convenience of description, but it may be equally applied to other moving objects.

For example, referring to FIG. 2, the above-described moving objects and devices may be always connected through a network on the basis of a fleet system. More specifically, in a fleet system, a particular moving object may be always connected with the device for the vehicle owner. For example, the vehicle may provide the service through the fleet system only when the vehicle is connected to the device of the vehicle owner, and some forms of the present disclosure are not limited thereto. In addition, as an example, a plurality of vehicles and devices of tenants capable of using the vehicles in the fleet system may be always connected through a network. That is, the tenants may check information on the vehicles provided on the basis of the fleet system in real time through their own devices, and a service operation may be performed using the vehicle on the basis of the information. Meanwhile, as another example, vehicles and devices connected to each other through the fleet system may be limited to vehicles and devices included in a specific group. For example, a large number of vehicles and devices may be registered in the fleet system. Herein, unnecessary overhead may occur and service may not be smoothly provided when the vehicles and the devices registered in the fleet system are connected to each other. In view of the foregoing, the fleet system may provide connections of vehicles and devices included in a specific group. That is, the management of service provision may be performed on a group in which vehicles and devices are connected to each other in a fleet system. Meanwhile, the vehicle and the device of the vehicle owner may be connected with devices of tenants in a group in which the owner is included. In addition, the tenant device is always connected to vehicles in a group in which the tenant is included. Accordingly, the tenant may check the vehicle status in real time to determine whether to use the vehicle. That is, a plurality of devices and a plurality of vehicles may be connected to each other, as described above. Hereinafter, a method of recognizing a vehicle which is intended to be used by the tenant and using the vehicle on the basis of the recognition will be described.

As another example, a road side unit (RSU) may be a device capable of communication as a device around the road. In addition, as an example, the RSU may refer to a structure installed to transmit and receive signals to a building or other area, and some forms of the present disclosure are not limited thereto. However, Hereinafter, the RSU generally referred to for convenience of description may be various structures or devices, and some forms of the present disclosure are not limited thereto.

In addition, as an example, the RSU may be a device capable of communication, which is arranged at a predetermined distance or periodically on the road. In addition, as an example, the RSU may be a device capable of communicating with the moving object, which is disposed at a specific point on the road. As another example, the RSU may refer to a terminal capable of communication as a traffic infrastructure. As another example, the RSU may refer to a device capable of communication as a V2X terminal, a surrounding moving object, or other moving objects. That is, the RSU refers to a device capable of performing communication with the moving object around the moving object.

In addition, as an example, the moving object provided in the fleet system may be a shared moving object. For example, a moving object shared by an individual may be a moving object provided by a system or a provider. That is, the moving object may be a moving object shared by the system rather than a moving object in which private property exists, and is not limited to some forms of the present disclosure.

In addition, the fleet system may be a moving object sharing system. The fleet system may be a system in which moving objects are shared in a certain area. Herein, the certain area may be a local concept, such as an apartment complex, a working area, and the like. For example, the certain area may include an area inside the apartment complex and an area spaced a predetermined distance from the apartment complex. As another example, the certain area may mean an area spaced a predetermined distance from the work place. As another example, the area to which the fleet system is applied may be a larger area or a city unit in terms of an administrative area, and some forms of the present disclosure are not limited thereto. That is, the certain area may mean a reference range capable of being operated through the fleet system, and may be changed by the user or the system. In addition, as an example, the fleet system may be a system in which a moving object is shared with a user authenticated as a specific user (or device). For example, a specific user may be an apartment resident who may be provided with the fleet system service. For example, the fleet system may provide a moving object sharing service on the basis of devices registered by apartment residents. This allows the sharing service to be provided only to the specific user, thereby increasing vehicle security and manageability. However, the specific user who uses the moving objects shared in the fleet system may be determined according to different methods, and some forms of the present disclosure are not limited thereto. The moving object sharing fleet system may be provided with shared moving objects. Herein, the shared moving object may be a moving object authenticated and authorized to be shared by the system. For example, the shared moving object may be a moving object registered in the fleet system. Herein, the fleet system manager may supply shared moving objects with the fleet system. That is, only moving objects authenticated or authorized by the fleet system manager may be used as the shared moving objects. This enables preventing accidents caused by security or management of the shared moving objects in the fleet system. More specifically, the fleet system may have the shared moving objects registered. A right to register a moving object as the shared moving objects in the fleet system may be limited by the fleet system. Herein, the moving objects capable of being registered in the fleet system may have the same ID or the same identification information to each other. In addition, the fleet system provides the shared moving objects while managing the same. For example, the management of the shared moving objects may be necessary to provide shared vehicle service, such as residual oil information, vehicle state information, or vehicle driving information for a moving object registered in the fleet system. Herein, the fleet system may check the state of the shared moving object in real time, and in the case of a moving object in which a failure occurs, the fleet system may limit an authority for use thereof or transmit a repair command therefor through the system, thereby providing the service in such a manner.

As another example, the fleet system may provide a shared moving object provided by the system, as well as a private moving object owned by an owner as described above. For example, the fleet system may set identification information for distinguishing shared moving objects provided by the system from privately owned moving objects. To the end, a privately owned moving object indication field may be provided. When the privately owned moving object indication field is 0, it may indicate that the shared moving object is a moving object provided by the system provider without private ownership. Meanwhile, when the privately owned moving object indication field is 1, it may indicate that the moving object is privately owned and provided as a shared moving object to the fleet system, which is shown in Table 1 below. That is, the case where the privately owned moving objects and the shared moving objects provided by the system are mixed on the basis of the above description may also be considered. Herein, as an example, the service provided by the fleet system may be varied according to the moving object type indication field. For example, in the case of a moving object provided by the fleet system, there may be no usage limit for a user who uses the moving object. Meanwhile, the usage limit may exist in the case of a privately shared moving object. As another example, the fleet system moving object and the privately shared moving object may provide the service on the basis of billing systems different from each other, and some forms of the present disclosure are not limited thereto.

TABLE 1

| Vehicle type indication field | Indication information |
|---|---|
| 0 | Vehicle provided by fleet system |
| 1 | Privately shared vehicle |

As another example, in relation to a specific operation of the fleet system, the service may be provided on the basis of a device registered in the fleet system.

More specifically, the device registered in the fleet system may obtain shared moving object information after the authentication and security procedures for the system. That is, the shared moving object information may be provided to the device. Herein, the device may contact the moving object that is to be used on the basis of the information on the shared moving object.

For example, there may be moving objects or devices (or users) registered in the fleet system. Herein, the moving object registered in the fleet system may be a privately owned moving object as described above. For example, when a privately owned moving object is registered in the fleet system, the fleet system may provide incentive information in consideration of a situation in which the privately owned moving object is leased to another person. For example, the fleet system may determine the incentive information on the basis of at least one of a type, a state, years old, and a lease time for a privately owned moving object that is provided. That is, the fleet system may calculate the incentive information about the privately owned moving object provided to the tenant and provide the same to the owner of the privately owned moving object. For example, the owner of a privately owned moving object may receive a certain reward from the fleet system on the basis of the incentive information. In addition, as an example, the incentive information may be utilized as information for using the fleet system, and some forms of the present disclosure are not limited thereto.

In addition, for example, only a specific moving object and device may be registered in the fleet system on the basis of authentication and authorization. Herein, the fleet system may be operated on the basis of state information of the registered moving object and device. For example, the fleet system may check information about a moving object currently being used and location information about an individual moving object in real time. Herein, for example, each moving object may periodically transmit its information to the fleet system. In addition, for example, each moving object may transmit its information to the fleet system on the basis of the event trigger. For example, when an event of a change in location or use of a moving object is triggered, the moving object may transmit its information to the fleet system (or server). In addition, the fleet system (or server) may check the information on the registered device in real time. Herein, as an example, the registered device may not always use the service of the fleet system. Therefore, activation information indicating whether the registered device uses the service of the fleet system may be needed. Herein, as an example, the fleet system may include list information about registered devices. Among registered devices included in the list of fleet system, a device that is currently using a moving object or activates the system for use of a moving object may be provided as the list information. As another example, the devices may be classified into a registered device (deactivated device) that does not use the fleet system, a registered device (activated device) that is using a moving object of the fleet system, and a registered device (temporary device) that is to use a moving object. That is, it is possible to provide information about whether a device is actually in use, whether there is a use intention of a device, and whether a device is not used yet even with a use intention. In addition, as an example, usage state information may be further indicated for a device using a moving object of the fleet system. For example, the usage state information may further include use estimated time information, use location information, or the like.

In more detail, the fleet system may include list information about a plurality of moving objects and a plurality of devices that are registered. Herein, the list information may include at least one of usage state information, device location information, and moving object location information. Herein, the fleet system may provide the moving object sharing service on the basis of the device location information and the moving object location information. In addition, the above-described usage state information may include at least one of information on a moving object in use, estimated time information on a moving object in use, device-moving object matching information, deactivated device information, activated device information, deactivated moving object information, and activated moving object information. Herein, as an example, the usage state information may further include information on moving object in use that is being used by another device and estimated time information on the moving object in use. In addition, the usage state information may further include device-moving object matching information on the basis of the list form information. In addition, the usage state information may include activated device information and deactivated device information. For example, as described above, the activated device information may be a device that is currently using the moving object or preparing to use the moving object among devices registered in the fleet system. For example, the activated device may mean a device that executes a program or an application for the fleet system. Meanwhile, the deactivated device may be a device that is registered in the fleet system but does not use moving object sharing. For example, the deactivated device may be a device that does not execute or deactivates a program or application for the fleet system.

In addition, the fleet system may include activated moving object information and deactivated moving object information. In this case, as an example, the fleet system may include state information about a plurality of moving objects. In this case, the state information on the moving object may be information on the moving object, such as information on whether there is a moving object abnormality, information on remaining distance to drive, or information on a time of refueling. That is, the moving object state information may be information for determining whether the moving object may be provided for moving object sharing, and some forms of the present disclosure are not limited thereto. Herein, the fleet system may determine whether to activate the moving object on the basis of the above state information. For example, when a moving object has no abnormal condition and a sufficient amount of fuel, the fleet system may classify the moving object into an activated moving object, whereas when a moving object has an abnormal moving object condition, the fleet system may classify the moving object into a deactivated moving object. Herein, the fleet system may provide information on the deactivated moving object to an associated system or server. For example, the associated system or server may perform repair or management on a deactivated moving object, and some forms of the present disclosure are not limited thereto.

In addition, as an example, when a moving object has an amount of fuel below a predetermined level, the fleet system may classify the moving object into a deactivated moving object, as described above. As another example, when a moving object having an amount of fuel below a predetermined level is shared through a device, the fleet system may notify the device user of information about the amount of fuel. In addition, as an example, the fleet system may provide a user with information about an associated specific system (e.g., a gas station of a specific brand), in which information indicating that refueling is required may be provided. Herein, the fleet system may exchange information on the billing or other necessary information with the associated specific system regardless of the user, thereby providing the service in such a manner.

That is, a user using the moving object sharing system may refuel the moving object at a designated place without paying a fee, and the fee may be processed through the system associated with the fleet system.

In addition, as an example, the fleet system may operate using edge computing. In this case, the edge computing may be a method of performing data processing through the device itself or a peripheral device without transmitting data processing to a data center (or cloud, server). For example, it is possible to improve data processing efficiency through the edge computing. As another example, security of data processing may be increased on the basis of distributed processing, and some forms of the present disclosure are not limited thereto.

Figure 3A:
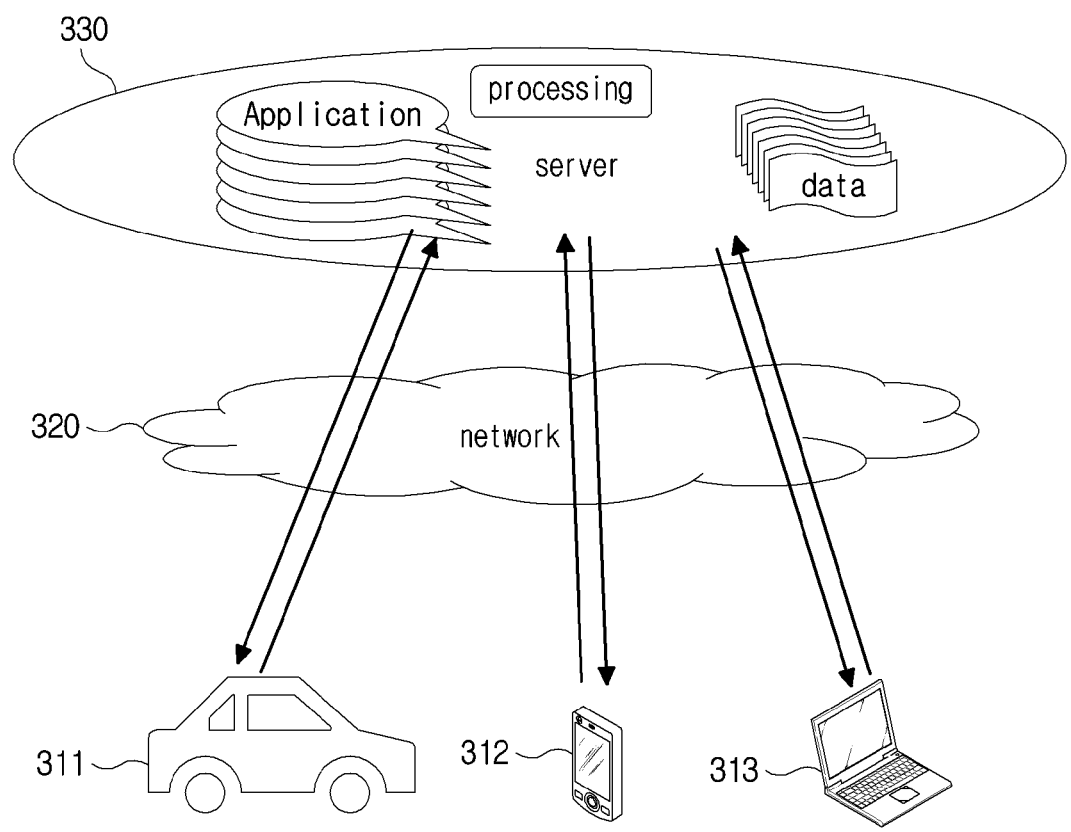
FIGS. 3A and 3B are diagrams illustrating a data processing method using edge computing.

More specifically, referring to FIG. 3A, a method of processing data may be used on the basis of the existing data center. For example, when processing data through a data center (or cloud, server, 330), each device (e.g., moving object, mobile device, computer, 311, 312, 33) may sent the data that is to be processed through the network 320 to the data center 330. Herein, the data center 330 may process the received data using an application or the like and obtain a processing result. That is, the data center 330 may perform data processing on the transmitted data. Thereafter, the data center 330 may transmit the data processing result back to the devices 311, 312, and 313 through the network 320. That is, data for each of the devices 311, 312, and 313 may be processed in a centralized manner. However, in the above-described case, since the data center 330 needs to perform a process for a plurality of devices, a delay may occur in the data process. In addition, since the data itself must be transmitted to the data center 330, the security may be vulnerable.

Figure 3B:
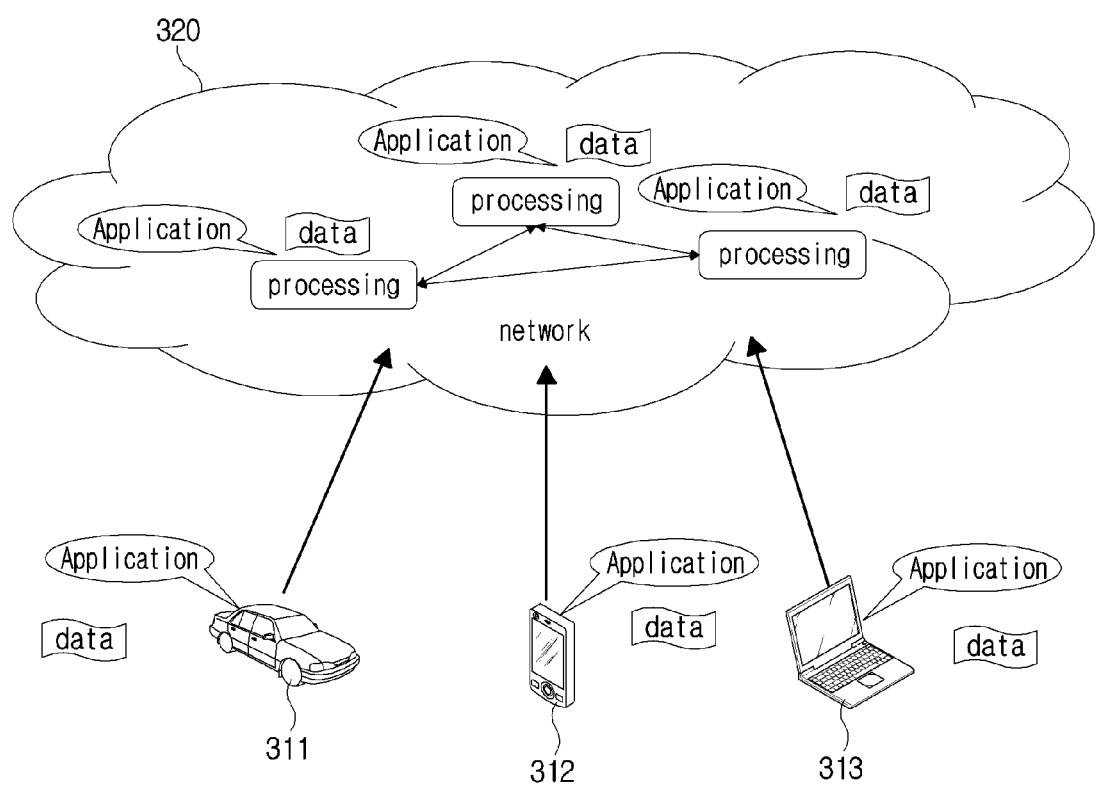

Meanwhile, FIG. 3B shows a method of processing data on the basis of edge computing. Herein, as an example, each of the devices 311, 312, and 313 may include a configuration capable of processing an application and other data by itself. That is, each of the devices 311, 312, and 313 may directly process data. In addition, as an example, data may be transmitted from the devices 311, 312, and 313 to the network 320. Herein, the data may not be transmitted to the data center but may be processed through network neighboring nodes. Herein, as an example, the node may be configured to include an application and other devices capable of processing data in the network 320 and perform data distribution processing. For example, the node may be a device of the same type as the above-described device. In addition, as an example, the node may be a moving object of the same type as the above-described moving object. In addition, as an example, the node may be another device or configuration, and the present disclosure is not limited thereto. For example, the node may be a physical device, and may be a software configuration implemented in one device, but the present disclosure is not limited thereto.

In addition, an application, a program, or a protocol for data distribution processing may be defined between each node. In more detail, each node may include an application for a fleet system. Alternatively, each node may include a program for a fleet system. In addition, each node may define a protocol for data processing in a fleet system and perform data distribution processing by exchanging data with each other through the protocol. Meanwhile, as an example, each node may separately set a protocol for data to be processed through the cloud and a protocol for data to be processed through neighboring nodes using edge computing. That is, a protocol type for cloud and a protocol type for edge computing may be set. Herein, for example, each node may distinguish data to be processed through neighboring nodes and data to be processed through the cloud and thus perform data exchange and processing through each of protocols, which will be described later.

That is, data for each of the devices 311, 312, and 313 may not be transmitted to the data center, but may be distributed through peripheral devices through the device itself or the network. Through the foregoing, it is possible to improve the speed of data processing can be improved, and thus improve the security through distributed processing. A method of providing a fleet service will be described in view of the foregoing.

For example, the device may be assigned a moving object to use through the fleet system. Herein, for example, the fleet system may perform allocation only for moving objects within a certain distance from the location of the device, and the present disclosure is not limited thereto. Next, the device may approach within a certain distance from the moving object. Herein, the device may transmit an authentication signal to a moving object. In addition, for example, the device may use the shared moving object through a tag for the shared moving object on the basis of a list of available shared moving objects. For example, the device may perform a tag for a moving object on the basis of a magnetic such as NFC, Bluetooth, or a traffic card. Herein, the shared moving object may perform an authentication procedure from the fleet system to allow the device to provide the moving object by when the device is tagged. For example, when the authentication is completed on the basis of the device tag, the door of the moving object may be opened.

With respect to a more specific operation for authentication, when the device approaches the moving object within a certain distance, the authentication signal may be transmitted to the moving object. Herein, the communication between the moving object and the device may be Bluetooth, NFC or a tag as described above. That is, a procedure for authentication may be performed under certain conditions, and the present disclosure is not limited thereto. When the device approaches (or tags) the moving object, the moving object and the device may determine whether the device is capable of using the moving object through signal exchange and may be authenticated. Herein, the device may transmit its own identification information and an authentication signal including the identification information of a group including the device itself to the moving object. Herein, the moving object may determine whether the device is a device registered in the fleet system on the basis of the device identification information included in the received authentication signal. In addition, the moving object may check whether the device is a device included in a group capable of providing the service on the basis of the group identification information included in the authentication signal. That is, the moving object may determine whether the device may use the moving object on the basis of the device identification information and the group identification information. As an example, when the device cannot use the moving object, the moving object may transmit information about the unavailability to the device. For example, the device may obtain information about the unavailability from an application or another service providing program.

Meanwhile, when the device uses the moving object, the moving object may transmit a request signal for performing the authentication procedure to the device. That is, when the device is legally registered in the above-described fleet system and the moving object also legally operates on the basis of the fleet system, the moving object may transmit a request signal for performing an authentication procedure to the device. Herein, the moving object may transmit its identification information and encryption key information to the device as a request signal for performing an authentication procedure. For example, both the identification information of the moving object and the device information may be information registered in the fleet system. Herein, the moving object may transmit a signal including identification information of the moving object, identification information of the device, and encryption key information to the fleet system.

In addition, the device may also transmit a signal including identification information of the moving object, encryption key information, and its own identification information, which is included in the authentication procedure execution request signal, to the fleet system.

Thereafter, the fleet system may compare information included in a signal received from the moving object with information included in a signal received from the device. Herein, when the identification information of the moving object, the identification information of the device, and the encryption key information all match to each other, the fleet system may recognize that the device may use the moving object. Thereafter, the fleet system may transmit authentication confirmation information to the moving object and the device. Herein, the fleet system may register information that the device uses the moving object in a database. In addition, for example, a time when the device uses the moving object and additional information may also be continuously transmitted.

In addition, the moving object may register a device on the basis of the authentication confirmation information and open a door of the moving object. In addition, the locking device for using the moving object may be released to allow the device to control the moving object.

Figure 4:
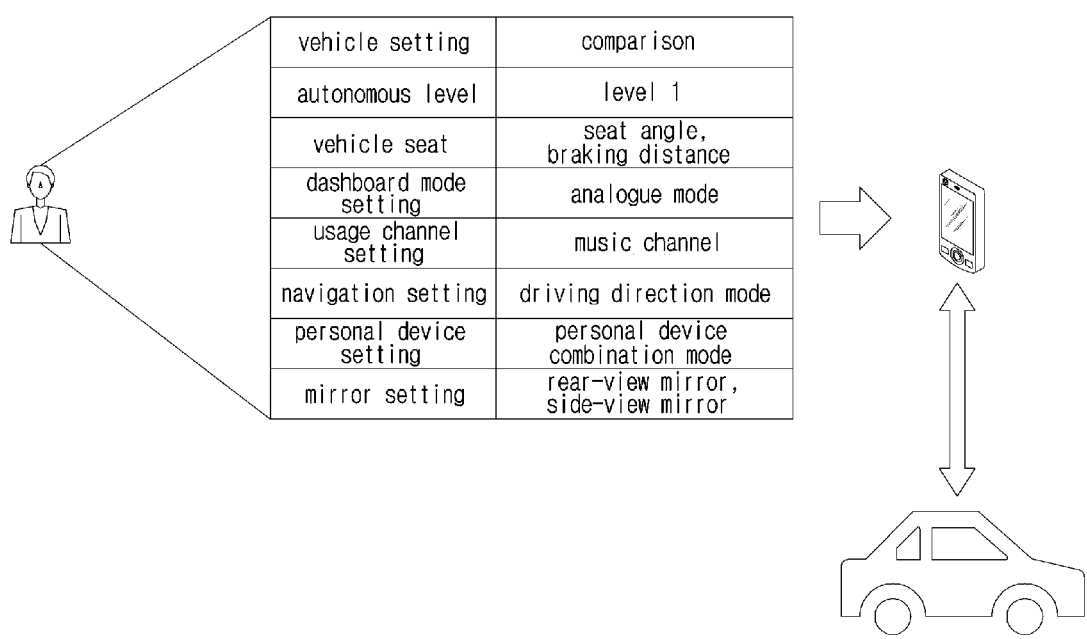
FIG. 4 is a diagram illustrating a method of providing a fleet service using edge computing.

Herein, for example, referring to FIG. 4, the device may provide the moving object with personal style information or user information. For example, the device may include information about autonomous driving level setting, moving object seat, instrument panel mode setting, used channel setting, navigation setting, personal device setting, mirror setting, and the like, as the personal style information. However, this is only one example and some forms of the present disclosure are not limited thereto. That is, the moving object provided by the fleet system may be in the form of communicating with a personal device having a personal driving style stored in a learned manner. Accordingly, even when a privately owned moving object is provided with the tenant, it is possible to provide the service customized to the tenant. That is, the running performance and driving environment of the moving object may be converted in such a manner as to be customized to the user, and then provided to the user. As described above with reference to FIG. 4, the information may be converted into a form customized to a user and then provided. More specifically, according to the driving style set in the personal device, it is possible to provide various driving environments, such as a position and height of a driver's seat, a color and brightness of an interior light, a position and angle of room mirror and side-view mirror, a temperature control (air conditioner and heater) range in car, an angle of a steering wheel, a tire pressure, a transmission setting mode (normal, eco, power mode, etc.), a wireless communication connection mode (WAVE, cellular, etc.), an autonomous driving function setting variable range (speed and interval, lane change lateral speed, acceleration and deceleration, etc.), and the like.

Herein, for example, in order to operate on the basis of the above description, setting information about the tenant may be stored in the tenant device. Herein, when the tenant uses a moving object, the tenant device may be linked with the moving object. For example, as described above, when the tenant device is linked to the moving object, the setting information about the tenant may be provided to the moving object, and the operation is performed as described above. As another example, when the tenant device is linked with a moving object to allow the tenant to use the moving object, driving information about the tenant may be updated in the device. That is, the device may update on the basis of information obtained from the rented moving object as moving object driving information about the tenant. Thereafter, the device may update the setting information of the tenant, and may further utilize the update information when renting another moving object later. That is, history information about tenants may be managed by the tenant device, and related information may be used when the tenant uses a personally owned moving object. Meanwhile, as an example, when the tenant device and the moving object are linked to each other, information on using the moving object may be transmitted to the owner device. As an example, the owner device may continuously check information on whether to rent when the moving object is used by the tenant to be linked with the tenant device. Accordingly, the owner device may continuously check the information about the owned moving object.

Herein, for example, the setting for the moving object may be different for each user, and accidents may increase due to inexperienced operation when each user uses the moving object that does not match his or her setting. Therefore, an accident risk may be increased when a shared moving object is used. In consideration of the foregoing, when the fleet system provides a shared service through a shared moving object, the moving object may be set differently on the basis of the above-described information on the basis of a user's personal style.

As another example, a case may be considered in which a tenant reuses a previously used moving object through the fleet system. For example, when the moving object is shared through the fleet system, the same tenant may often use the same moving object on the basis of the similar living pattern. In consideration of the foregoing, the tenant device may store history information about the moving object once used. In addition, for example, the moving object may store history information about the tenant device used once. Herein, for example, when the moving object and the tenant device perform initial setting at the time of initial authentication, a plurality of procedures for authentication and identification may be performed. However, as described above, when the tenant device or the moving object includes the usage history information, the additional procedure may be omitted by performing only the basic authentication for the use of the moving object. For example, when the tenant device performs only basic authentication on the moving object, the moving object setting may be automatically changed on the basis of the previous usage history. For example, the history information may include usage history information, driving pattern information, personal style information, driving propensity information, and the like on the basis of the tenant device, and some forms of the present disclosure are not limited thereto. Herein, for example, based on the above-described history information, the moving object may further perform additional setting on the tenant device, and some forms of the present disclosure are not limited thereto.

In addition, in a specific example in which the device uses the shared moving object, the device may check a list of shared moving objects provided and select the shared moving object from among the list. Herein, when the device is adjacent to or in contact with the shared moving objects, the shared moving objects may be used with respect to the device. Herein, the shared moving object setting or other related settings are changed with respect to the device so that the device user may use the shared moving object. Herein, the moving object setting information reflects the user's preference or style, so that not only security and authentication related settings but also contents may be changed. For example, a form displayed on the shared moving object may be changed on the basis of the interface set in the device, whereby the shared moving object may be operated on the basis of the form. That is, as described above, when the device approaches the shared moving object, the shared vehicle may be changed and used with respect to the device.

Figure 5:
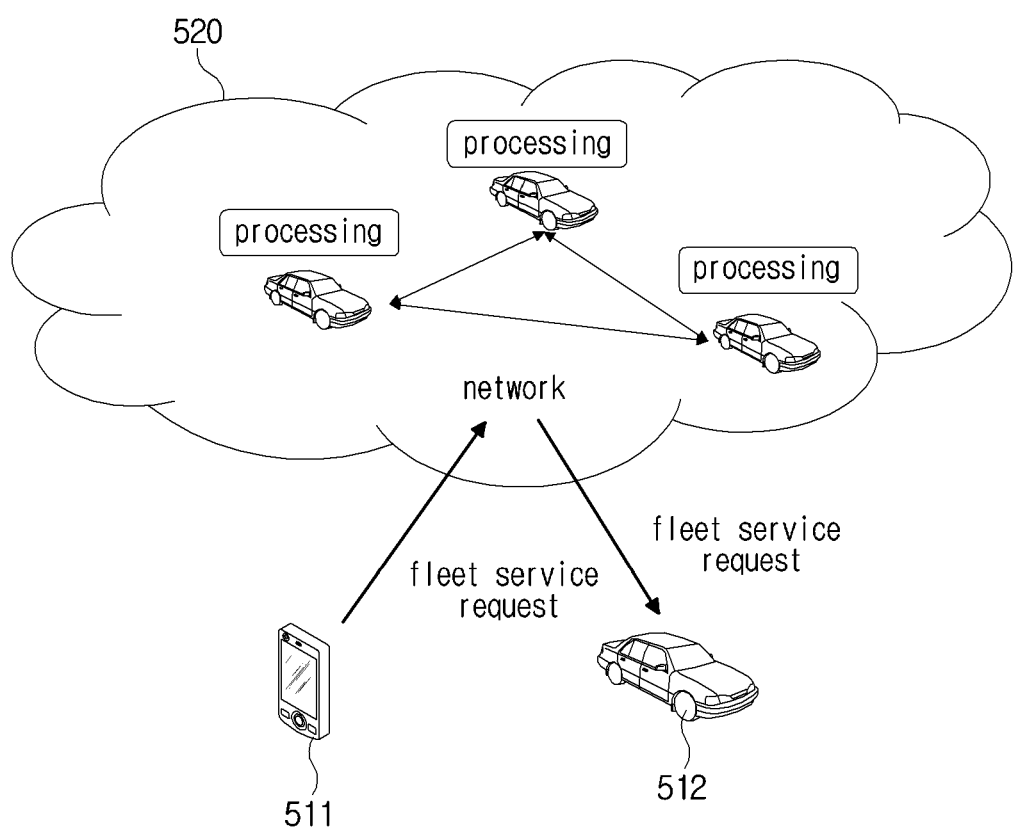
FIG. 5 is a diagram illustrating a method of performing data processing and management in a fleet system.

Herein, for example, the above-described moving object sharing service may be performed on the basis of edge computing. More specifically, referring to FIG. 5, the device 511 may transmit a fleet service request to a moving object 512 to be used. Herein, the moving object 512 may be a moving object that the owner owns, but the owner is not using, as described above. In addition, for example, the moving object 512 may be a moving object used for sharing a moving object in a fleet system, and the present disclosure is not limited thereto. In addition, for example, when the device 511 intends to use the moving object 512, a condition for using the moving object 512 may be set. For example, the device 511 may set a condition for a moving object use time, a source, a destination, a moving object type, a moving object use area, and other moving object related information. Herein, for example, the above-described conditions may be set in each of the device 511 and the moving object 512. That is, the device 511 may set a condition for selecting a moving object to be used. In addition, the moving object 512 may set a condition for the device 511 that may use the moving object. Herein, the shared service may be applied to the device 511 and the moving object 512 meeting the above-described conditions. Meanwhile, as an example, the above operation may be performed using edge computing. In more detail, the device 511 may transmit a fleet service request to the network 520 on the basis of the moving object usage condition. That is, the device 511 may transmit a request message to the network 520 to select a shared moving object to use. Herein, for example, the above-described message may include location information of the device 511. Herein, the network 520 may perform at least one operation of searching, identifying, and authenticating operations for providing an available moving object 512 on the basis of the location information of the device 511.

Herein, for example, the available moving object 512 in the device 511 itself may be searched and directly selected using an edge computing method. For example, the device 511 may transmit a message for setting a condition for using a moving object to peripheral devices through the network 520. Herein, when the moving object 512 satisfying the use condition set by the device 511 exists at a predetermined distance from the device 511, the device may select the corresponding moving object 512. Herein, the device 511 may identify the location information on the moving object 512 and may recognize and use the moving object 512 through tagging or signal exchange adjacent to the moving object 512 as described above. However, as an example, as described above, when the device 511 and the moving object 512 perform the above operation through one-to-one signal exchange, it may be difficult to maintain security of the moving object 512.

Herein, as another example, when the device 511 transmits a fleet service request message through the network 520, the network 520 searches for peripheral devices including the moving object 512 capable of being used and treat the fleet service request message on the basis of the found devices. In more detail, the above-described peripheral devices may be devices registered to provide the service in the fleet system. In addition, the peripheral devices may be devices located within a predetermined distance from the device 511 and the moving object 512, but the present disclosure is not limited thereto. Herein, the network 520 may transmit a message received from the device 511 to the available moving object 512 and the plurality of peripheral devices. Herein, the number of peripheral devices may be variously set, but the present disclosure is not limited thereto. For example, when the number of peripheral devices is determined, the fleet service request message may be transmitted to the available moving object 512 and the peripheral devices through the network 520. Herein, the available moving object 512 and the peripheral devices may generate a hash value for data processing on the basis of fleet ledger information stored. For example, the fleet ledger information may be information shared by nodes or devices authenticated in the fleet system for distributing data. That is, the hash value may be generated in each device on the basis of the fleet ledger information being shared. Herein, for example, the hash value may be generated on the basis of the fleet ledger information and the device unique information, and may be different for each device. As described above, the moving object 512 and the peripheral devices may be devices registered or managed in the fleet system, and may store the fleet ledger information on the basis of the fleet system. Herein, the moving object 512 may receive the processed hash values on the basis of the fleet service request message from the peripheral devices. Herein, the moving object 512 may know the identification information about the peripheral devices and the fleet ledger information. Accordingly, the moving object 512 may perform authentication and identification on the device 511 using the received hash value, the identification information of peripheral devices, and the fleet ledger information. That is, information for processing data may be shared with peripheral devices, and authentication may be completed through values received from each device, thereby increasing authentication security. Through the above description, even when there is no server or cloud, the authentication may be performed on the device 511, and the security may be secured even on the moving object 512.

Figure 6A:
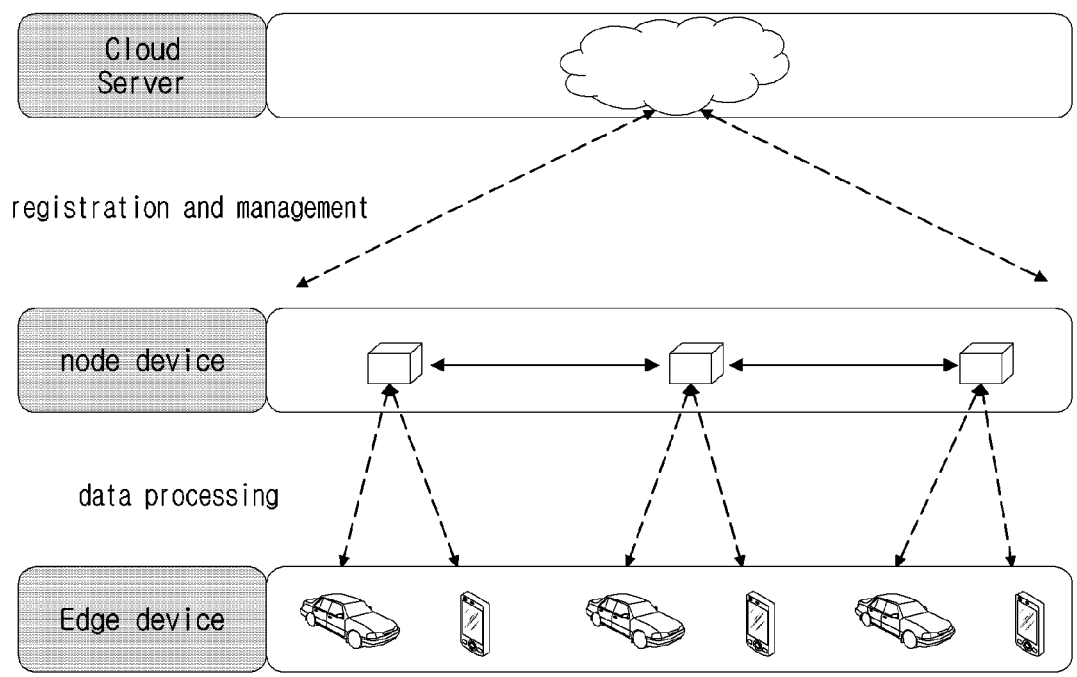
FIGS. 6A and 6B are diagrams illustrating a method of sharing a moving object in a fleet system.

Herein, as an example, with respect to the above-described operation, referring to FIG. 6, a case in which a data center (or a cloud or a server) is included as edge computing (FIG. 6A) and a case in which the data center is not included may be considered.

For example, referring to FIG. 6A, the fleet system may be provided based on the edge computing described above. That is, data processing necessary for using a moving object through a device may be performed through neighboring nodes via a network. Herein, for example, in the fleet system, there may be a protocol for data exchange and processing between the cloud and each node. In addition, for example, in a fleet system, protocols may exist for data exchange and processing between respective nodes. That is, protocols in the node-cloud relationship and protocols between the nodes may be different types of protocols. As another example, a frame type for performing data exchange between nodes and a frame type for performing data exchange between a cloud and a node may be different.

Herein, for example, in the cloud (or server), node registration and management for a fleet system may be performed. More specifically, nodes for providing a moving object sharing service in a fleet system may be registered or authenticated nodes. The cloud can allow the information for the fleet system to be shared with the nodes. Herein, each node can use a protocol set up for data exchange with the cloud. In addition, each node may perform data transmission through a frame format used for data exchange with the cloud. Herein, for example, data exchanged between nodes and the cloud may be information about registration and management of nodes. In addition, for example, most information may be processed at the nodes, but information required to be recorded or stored may be transmitted to the cloud. That is, information about registration and management and information required to stored as a history may be transmitted to the cloud.

More specifically, when nodes are registered and managed in the cloud, the cloud may perform registration and management operations on the basis of location information of the nodes. In addition, the cloud may check information on whether nodes are in a state capable of performing an operation for a service of a fleet system. The cloud communicates with the nodes and may authenticate whether the node is a node for the fleet system on the basis of node's location information and state information. Herein, the cloud may determine whether the node is a node for a fleet system based on periodic or event triggering. Herein, when the cloud has completed authentication for the node, the cloud may transmit authentication value information for the fleet system to the node. Herein, for example, the above-described authentication value may be a value generated in real time. The nodes may be in an inoperable state for data processing depending on the state and location of the nodes. In consideration of the foregoing, all nodes may not be capable of data processing for a fleet system. Therefore, real-time authentication may be required for the nodes, and the above-described authentication value may be generated in real time. Herein, for example, a device that is to use a cloud and a moving object may store an authentication value that varies in real time. That is, the authentication value is changed in real time in the cloud, and the same value may be changed in real time in the device. Herein, the cloud may periodically transmit, in real time, the varied authentication values to nodes capable of data processing. Herein, since the device also stores the authentication value that changes in real time as described above, the authentication value is compared with authentication value received by the nodes to perform data processing and authentication operation. In view of the foregoing, the data processing may be performed through the device and the nodes around the moving object, and may operate without delay. Meanwhile, for example, the cloud may store list information about nodes that may provide the fleet service. Herein, as an example, as described above, a protocol in which the cloud performs data exchange and processing with nodes may be defined, and a frame format for this may be defined, as described above.

In addition, for example, each node may perform data exchange using a protocol for data exchange between nodes. Herein, a frame format used by the nodes may differ from a frame format for communicating with the cloud as described above. That is, each node may set a separate protocol and frame for communication with each other. Herein, for example, data exchanged and processed between nodes may be identification and authentication information or information required to be confirmed in real time. For example, as described above, in order for a device to use a shared service for a moving object, it is necessary to perform identification and authentication. Herein, when the device transmits fleet service request information to the moving object, the moving object may perform identification and authentication through neighboring nodes. That is, the moving object may directly perform identification and authentication operations through neighboring nodes without exchanging data with the cloud. Through this, the moving object can improve data security through distributed processing. In addition, the moving object may perform data processing without delay because the moving object uses a neighboring network.

As a more specific example, each node may include the fleet ledger information as information for the fleet system. Herein, for example, the fleet ledger information may be provided through the cloud. That is, the cloud may provide the fleet ledger information as information shared when the cloud registers and manages nodes for service provision in the fleet system. Authentication for the moving object and the device may be performed in neighboring nodes through the fleet ledger information, as described above.

Figure 6B:
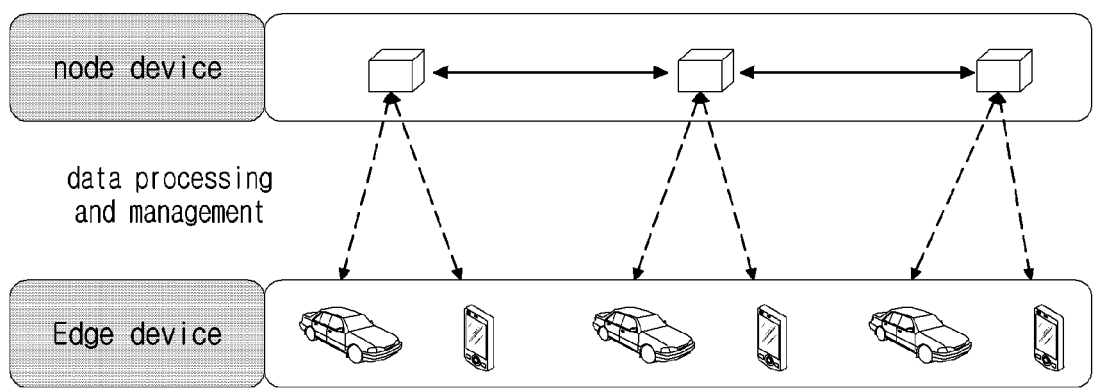

As another example, the fleet service may be provided by neighboring nodes without a cloud as shown in FIG. 6B. Herein, neighboring nodes may configure applications, programs or protocols for the fleet system in advance. As an example, the neighboring nodes may install or include an application for the fleet service in advance. In addition, the neighboring nodes may set the program or protocol for fleet system in advance. That is, nodes operating for the fleet service may set applications, programs, and protocols for the fleet system in advance, but the present disclosure is not limited thereto. Herein, for example, when a device intends to use a moving object, the device may search for a moving object located nearby. For example, the device and the moving object may include identification information capable of mutual recognition on the basis of the same system or the same application. Herein, when the device selects the moving object, the device may transmit request information for using the moving object to the moving object. For example, the moving object may transmit information for device identification and authentication to neighboring nodes on the basis of the above-described identification information. Herein, the neighboring nodes may perform the above-described identification and authentication on the basis of information shared with the moving object and may transmit the authentication result to the moving object. As described above, the moving object may perform identification and authentication on the device through the received information and determine whether to provide the fleet service. In other words, the moving object can perform identification and authentication through only the neighboring nodes without the cloud. Meanwhile, as an example, the moving object may directly store information required to be stored or history information. In addition, information that is not required to be processed in real time or to be stored may be deleted after data processing, thereby securing a storage space. That is, the moving object may play a role of directly storing data without a cloud, and may perform the fleet service by performing data processing through neighboring nodes.

As a more specific example, when an owner for a moving object exists and the owner does not use the moving object, a case in which the moving object is shared may be considered. Herein, the moving object may transmit request information to the owner device. Herein, for example, the request information may include information about using a moving object and information about the device. Herein, the owner device may determine whether to accept the request on the basis of the received information, and transmit the response information to the moving object. Herein, when the request is accepted from the owner device, the moving object may transmit information for device identification and authentication to neighboring nodes. For example, the information for identification and authentication may be transmitted to the neighboring nodes through the above-described protocol and frame format, and may include identification information of the device. The neighboring nodes may transmit, to the moving object, response information on the identification and authentication information on the basis of the received information, and complete the identification and authentication for the device through the moving object. Herein, control authority for a moving object may be provided to the device, as described above. Herein, for example, information on the usage history and information on the setting of the moving object may be stored in the moving object and the device, and may operate on the basis of the information.

As another example, a case in which a moving object is provided by a system or a provider may be considered. Herein, when the moving object receives a use request signal from the device, it is determined whether to use the moving object on the basis of the condition information set by the device. Herein, the request signal may include at least one of identification information about the device, source information, destination information, use time information, and use region information. In other words, the moving object may directly determine the information transmitted by the device to determine whether to use the moving object.

In addition, for example, when a moving object is shared, an unauthorized take-over of the moving object and a security accident may occur. For example, when another device is accessed while the moving object is being shared, an error may occur, and safety and security problems may occur. Therefore, in consideration of the above-described situation, identification and authentication of the device and the moving object may be performed on the basis of the neighboring nodes. In more detail, when the device transmits a use request signal to the moving object, the moving object may search for neighboring nodes for identification and authentication. Herein, the moving object may transmit information for identification and authentication to neighboring nodes, and may use the above-described protocol or frame format. As a specific example, the moving object and neighboring nodes may share fleet ledger information on the basis of the fleet system as described above. Herein, the neighboring nodes may generate a hash value through the information received from the moving object and the shared fleet ledger information, and transmit the same to the moving object. As an example, the moving object may receive the above-described hash values. The moving object may perform identification and authentication on the basis of the received hash value, identification information on neighboring nodes, and fleet ledger information. That is, in order to increase authentication security, information is identified at neighboring nodes including the device and the moving object, and the identified information must be shared so that authentication may be completed, thereby improving the security. Herein, for example, usage history information may be stored in the moving object and the device. In addition, for example, it is possible to perform subsequent management for the moving object on the basis of the above-described history information, but the present disclosure is not limited thereto. In view of the foregoing, the shared service may be provided in a fleet system through edge computing.

That is, a case where a cloud exists for a fleet system so that the service is provided using edge computing and a case where a cloud does not exist may be considered, but the present disclosure is not limited thereto.

As another example, the fleet system may provide a service through edge computing on the basis of moving objects and/or devices that are mutually authenticated on a platform without a cloud or a server. Herein, the moving objects and/or the devices may perform mutual authentication and registration through the platform provided for the fleet system. That is, as described above, the above-described fleet system may be operated by moving objects and/or devices recognized through the platform without a cloud or a server through mutual authentication and registration.

For example, a platform for the fleet system may be provided to the moving object and/or the device. Herein, for example, the platform may be configured to allow the moving object and/or the device to use the fleet system on the basis of a software configuration. In addition, for example, the platform may operate on the basis of components commonly embedded in the moving object and/or the device based on a hardware configuration, but the present disclosure is not limited thereto.

Herein, for example, the moving object and/or the device may search for other moving objects and/or devices that may provide the fleet system on the basis platform. Thereafter, the moving object and/or device may perform authentication and registration with the other moving object and/or device that is found, and share certain information, thereby maintain the security. Then, when moving objects and/or devices are added, authentication and registration may be performed on the basis of the previously registered moving objects and/or devices, and certain information may be shared after authentication to maintain security. That is, each moving object and/or device may perform mutual authentication and registration through a platform without a specific server or a cloud, and registration and deletion may be performed on the basis of the platform in this process. Thereafter, the registered moving objects and/or devices may provide the fleet service on the basis of the foregoing, but the present disclosure is not limited thereto.

FIG. 7 is a diagram illustrating a method of providing a fleet service using edge computing. As a specific example of providing a fleet service, referring to FIG. 7, the device 710 may search for a moving object 720 to be used through a network. For example, the device 710 may search for an available moving object through a network. Herein, the device 710 may set a usage setting condition as described above. Herein, the moving object 720 that satisfies the above-described usage setting condition may be searched from among the moving objects 720 located within a predetermined distance from the device 710. Thereafter, the device 710 may select the moving object 720 and transmit a request message for use. Herein, moving object 720 may determine whether to provide use on the basis of the request message. That is, the moving object 720 may determine whether to accept the request. Herein, when the moving object 720 does not accept the request, the moving object 720 may transmit information to the device 710 that the moving object 720 does not accept the request. In addition, for example, when the moving object 720 accepts the request, the moving object 720 may transmit information about the request acceptance to the device 710 and operate on the basis of the request acceptance.

Figure 8:
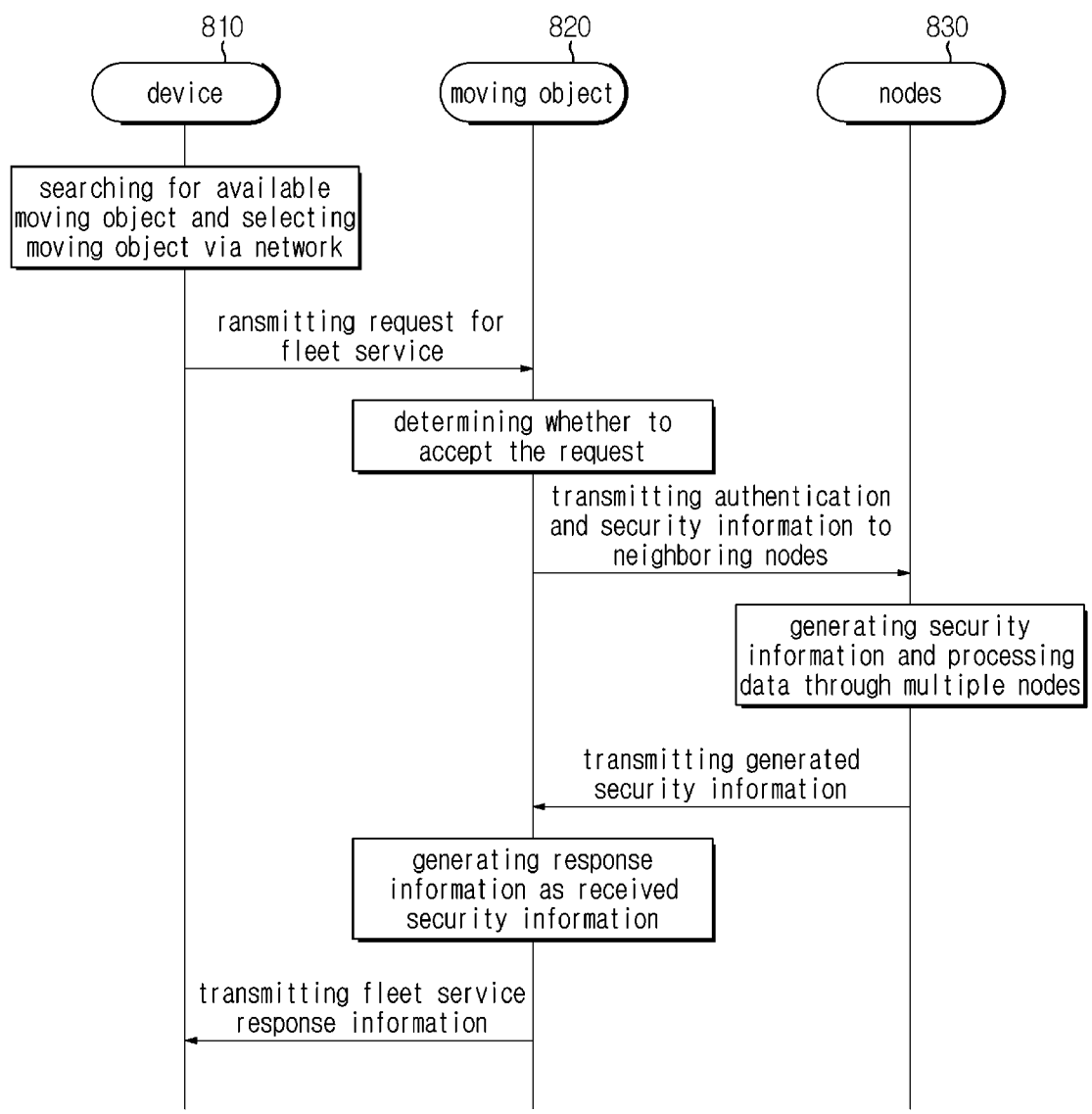
FIG. 8 is a diagram illustrating a method of performing identification and authentication for autonomous shuttles and neighboring nodes using edge computing.

FIG. 8 is a diagram illustrating a method of performing identification and authentication for autonomous shuttles and neighboring nodes using edge computing. For example, referring to FIG. 8, when the moving object 820 receives the fleet service request information for identification and authentication as described above, the moving object 820 may transmit authentication and security information to the neighboring nodes 830 through a network. Herein, for example, the moving object 820 may generate information for authentication and security on the basis of the request information received from the device 810. Thereafter, the moving object 820 may transmit information about the generated authentication and security to the neighboring nodes 830. Herein, the neighboring nodes 830 may generate a hash value using the received information. Herein, the neighboring nodes 830 and moving object 820 may share fleet ledger information. Herein, as a specific example, the fleet ledger information may be fleet authentication ledger information. That is, the devices in the fleet system may share the ledger information for authentication. Herein, for example, the neighboring nodes 830 may be nodes authenticated or registered by the fleet system, as described above. The neighboring nodes 830 may transmit the hash value generated as described above to the moving object 820, and the moving object 820 may generate response information on the basis of the received hash value information and transmit response message to the device 810. Meanwhile, for example, even when some errors exist in the received hash values with respect to the authentication method for the moving object 820, the authentication may be completed through a plurality of hash values and a plurality of device identification information, but the present disclosure is not limited thereto. That is, even when an error occurs or illegal information such as hacking information is included in some of the plurality of devices in the fleet system, the entire authentication may not be affected, thereby improving the security.

Figure 9:
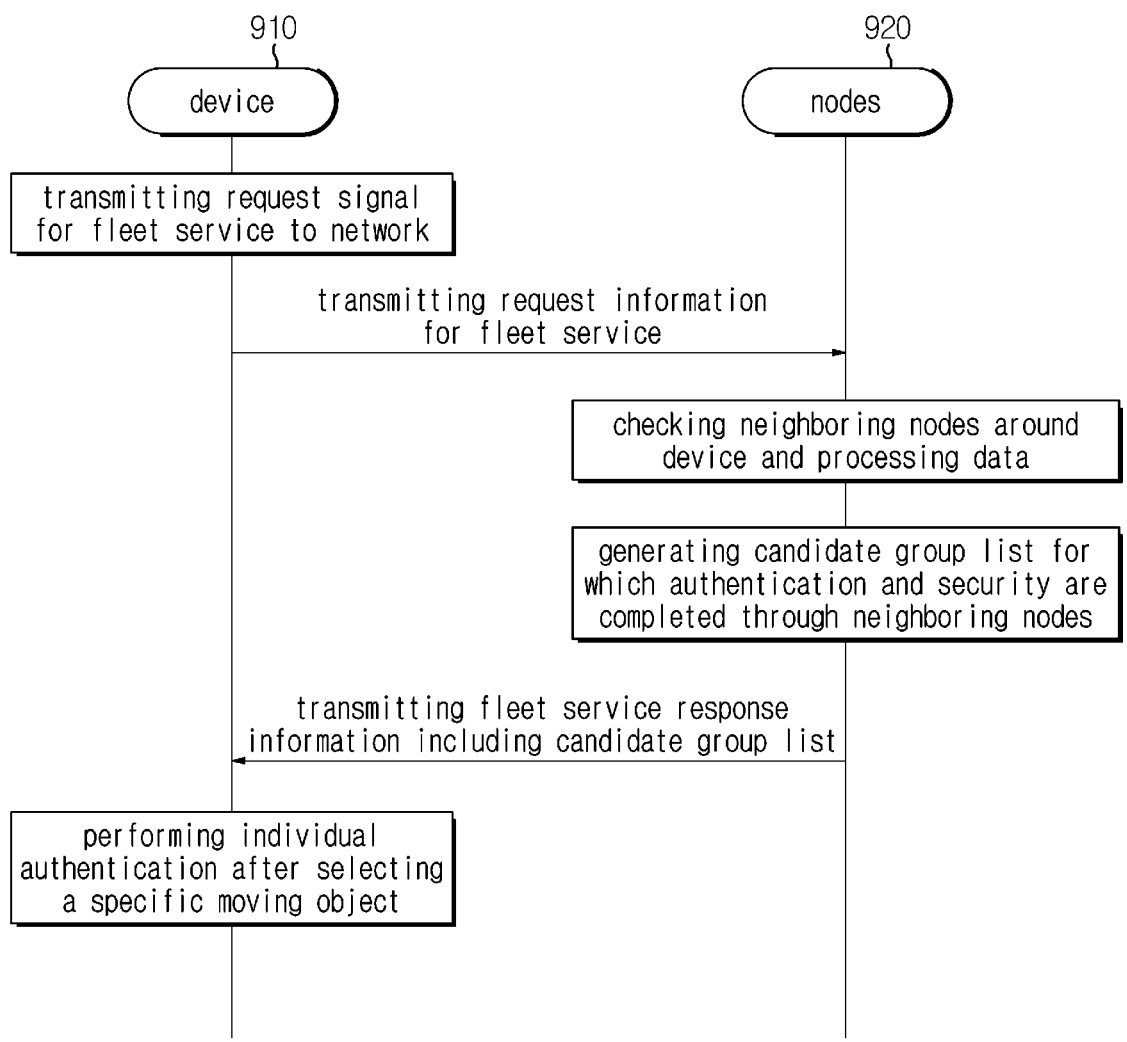
FIG. 9 illustrates a method of searching for a moving object using edge computing in a fleet service.

FIG. 9 illustrates a method of searching for a moving object in a fleet service using edge computing. As another example, referring to FIG. 9, edge computing may be applied when the device 910 searches for available moving objects. For example, the device 910 may transmit a request signal for a fleet service to a network. Herein, neighboring nodes 920 around the device 910 and the device 910 may share fleet ledger information. For example, the neighboring nodes 920 may be nodes authenticated or registered by the fleet system as described above. In addition, the fleet ledger information may be fleet search ledger information. For example, the above-described fleet authentication ledger information and the fleet search ledger information may be ledgers different from each other. In more detail, as described above, the fleet authentication ledger information may be ledger information shared in the fleet system to complete the identification and authentication operation in the selected moving object. In addition, for example, the fleet search ledger information may be ledger information for searching for moving objects authenticated by the device through neighboring nodes.

Herein, when the neighboring nodes 920 receive fleet service request information from the device 910, the neighboring nodes 920 may generate a hash value on the basis of the fleet search ledger information. Herein, the neighboring nodes 920 may share the hash value and complete identification and authentication for the device on the basis of the hash value. In addition, the neighboring nodes 920 may form a list of available moving object candidate groups through the hash value. Herein, the neighboring nodes 920 and the moving object may share the aforementioned fleet search ledger information. Herein, the neighboring nodes 920 may transmit, to the moving objects, the hash value generated on the basis of the foregoing. The moving object may complete identification and authentication on the basis of the fleet search ledger information and the generated hash value, and the completed moving objects may be provided as a candidate group list. That is, the candidate group list may be information on moving objects for which identification and authentication are completed, and the information may be provided to the device 910. Thereafter, the device 910 may use the moving object by selecting a specific moving object from among moving objects included in the candidate group list and performing individual authentication for the moving object.

Figure 10:
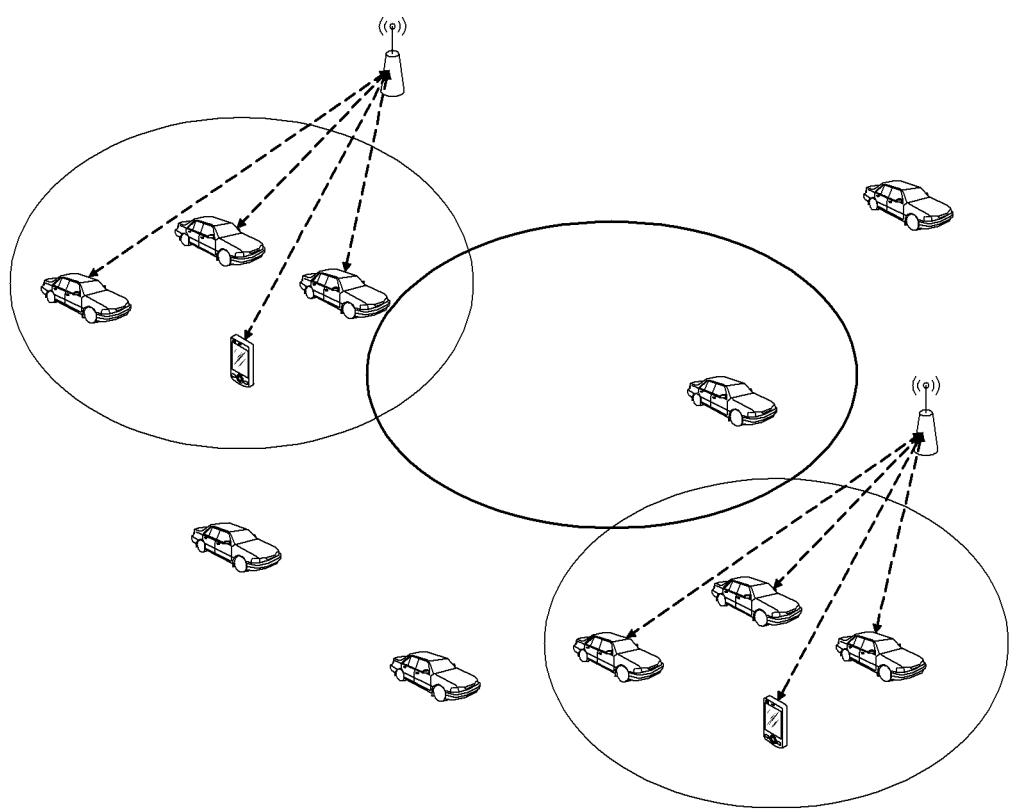
FIG. 10 is a diagram illustrating a region to which edge computing is applied.

Meanwhile, as another example, when using neighboring nodes in a fleet system, a range for neighboring nodes may be required as described above. For example, referring to FIG. 10, neighboring nodes may be nodes located within a predetermined distance from a device or a moving object. As another example, the neighboring nodes may be nodes located within the same base station coverage as that of the device or the moving object. That is, the nodes located in the same base station coverage as devices registered or authenticated in the fleet system may be the neighboring nodes described above. Herein, neighboring nodes, moving objects, and devices may perform identification and authentication operations to provide a fleet service, as described above, in which the fleet service may be provided on the basis of the same.

As another example, when the device registered in a fleet system may use the moving object through authentication as described above, the moving object needs to be associated with the device. For example, the moving object may detect that the device is adjacent to the moving object within a predetermined distance. Herein, when the device is adjacent to the moving object within the predetermined distance, the moving object may notify the device of information on whether to use the moving object. In addition, when the device is located within the predetermined distance, the moving object may communicate with the fleet system to cause a door to be automatically opened. In another example, the existing moving object could be managed and secured through a moving object key. Meanwhile, in the case of the shared moving object, the moving object user may be varied every time, and thus may not operate based on a certain key. That is, when the device is associated with the moving object to perform authentication through the fleet system, the moving object may be controlled. Each of the device and the moving object may include an application based on the fleet system. For example, the moving object may include an installation capable of implementing the application. As another example, the moving object may be provided as an installation for a fleet system through a detachable external device, and some forms of the present disclosure are not limited thereto. Herein, as an example, each of the device and the moving object may include cryptographic key information. Herein, the fleet system may exchange the cryptographic key information included in each of the device and the moving object so that the moving object may be controlled only when the authentication is enabled. Meanwhile, when the device uses a moving object, the moving object needs to prevent itself from being accessed by other devices. This makes it possible to prevent an accident from being caused when the device is collided with the other device. Herein, for example, when authentication is performed on the moving object and the device, the device may be used with being coupled to the moving object. For example, when the device is adjacent to the moving object on the basis of the fleet system, a door of the moving object may be opened. In order to secure stability on the fleet system, the device may be set to have a right to control the moving object only when the device is coupled to the shared moving object. That is, opening the door of the moving object may have a relatively low security level, but it is necessary to set the security level high in consideration of controlling the shared moving object with the device.

As another example, the fleet system may provide the moving object sharing service through communication with a RSU which is a peripheral infrastructure. For example, parking for a moving object registered as a shared moving object in the fleet system may be limited to a specified place. For example, the fleet system may create a group based on a predetermined area and provide the moving object sharing service by registering a plurality of moving objects in the group. Herein, as an example, the shared moving object may be parked only at a specified place in the area corresponding to the group. That is, the fleet system may perform parking management for the shared moving object and may perform management for location tracking. Herein, the fleet system may manage all moving objects only when the moving objects are parked at a specific place and the moving objects are used by the device. That is, the fleet system may efficiently distribute the moving objects through by checking the specific places and the used moving objects. Meanwhile, as an example, the fleet system may provide a command that forces the moving object to move through an administrator when the moving object distribution is not efficiently performed on the basis of the above-described management method, whereby the system may be smoothly operated.

As another example, the fleet system may manage moving objects using autonomous driving and the existing moving object, thereby providing the moving object sharing service. That is, the fleet system may provide the moving object sharing service on the basis of functions provided to each of moving objects including the legacy moving objects and the current moving objects.

In more detail, moving objects shared through the fleet system may provide the same function based on the same model. As another example, moving objects shared through the fleet system may provide different functions as different models from each other.

First, moving objects shared through the fleet system may provide the same function based on the same model. For example, the function may be an autonomous driving level. Herein, the autonomous driving function may be varied according to each autonomous driving level as autonomous driving information, and some forms of the present disclosure are not limited thereto. In the above-described situation, the fleet system may provide all the functions provided by the moving object to the device using the moving object. In addition, as an example, the fleet system may provide only a part of functions provided by the moving object to the device using the moving object. Herein, a user corresponding to each device may have different proficiency in handling the moving object, and in consideration of accident prevention and stability, the fleet system may provide moving object functions on the basis of user information corresponding to the device. That is, when it is determined that all moving object functions are available based on the user information, the fleet system may grant all functions to the device. Meanwhile, when the fleet system determines that all moving object functions are not available on the basis of user information (e.g., driving experience, autonomous driving experience, etc.), the fleet system will allow the device to have some functions, thereby preventing accidents from occurring.

Meanwhile, for example, when the fleet system provides shared moving objects having different functions from each other, the fleet system may further provide function information with respect to the moving objects used by the device. More specifically, the fleet system may provide the device with moving object information in advance, in order to prevent an accident that may occur because a user of the device does not properly understand the moving object function, whereby the fleet system can prevent accidents from occurring in the shared moving object.

Figure 11:
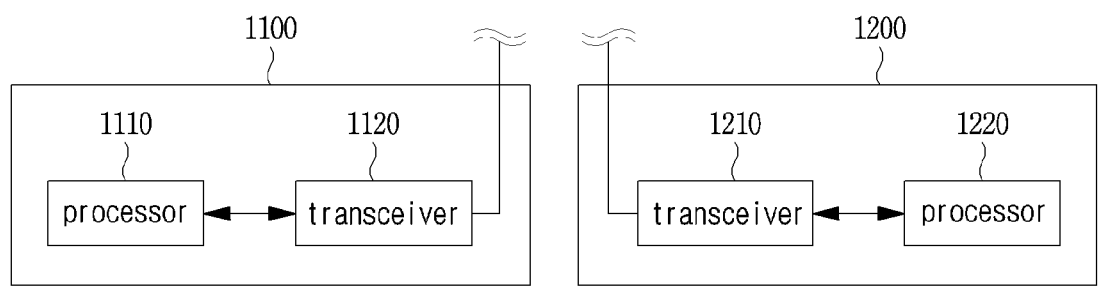
FIG. 11 is a diagram illustrating a configuration of a device operating in a fleet system.

FIG. 11 is a diagram illustrating a configuration of a first device 1100 and a second device 1200. Referring to FIG. 11, each of the first device 1100 and the second device 1200 may be a device that performs communication. For example, the first device 1100 and the second device 1200 may include at least one of the above-described device, moving object, fleet system (or server), and RSU.

That is, the first device 1100 and the second device 1200 may be devices that communicate with each other. Herein, for example, the first device 1100 and the second device 1200 may include processors 1110 and 1120 and transceivers 1210 and 1220 for the above-described operation. That is, each of the first device 1100 and the second device 1200 may include a processor for controlling a communication operation and a related operation. In addition, each of the first device 1100 and the second device 1200 may include a transceiver, in consideration of the above-described operations.

While the example methods of the present disclosure described above are represented as a series of operations for clarity of description, it is not intended to limit the order in which the steps are performed, and each step may be performed simultaneously or in a different order as necessary. In order to implement the method according to the present disclosure, the illustrated step may further include other steps, may include remaining steps except for some steps, or may include other additional steps except for some steps.

The various forms of the present disclosure are not an exhaustive list of all possible combinations, and are intended to describe representative aspects of the present disclosure, and the matters described in the various forms of the present disclosure may be applied independently or in combination of two or more.

In addition, various forms of the present disclosure may be implemented by hardware, firmware, software, or a combination thereof. The hardware may be implemented by one or more of application specific integrated circuits (ASICs), Digital Signal Processors (DSPs), Digital Signal Processing Devices (DSPDs), Programmable Logic Devices (PLDs), Field Programmable Gate Arrays (FPGAs), a general processor, a controller, a microcontroller, a microprocessor, and the like.

It is intended that the scope of the disclosure includes software or machine-executable instructions (e.g., an operating system, an application, firmware, a program, etc.) that causes an operation in various forms of the present disclosure to be executed on an apparatus or a computer, and non-transitory computer-readable media that are executable on a device or computer in which such software or instructions, and the like are stored.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of providing a moving object sharing service in a fleet system, the method comprising:
    searching for an available moving object by a device;
    performing authentication for the moving object searched by the device; and
    controlling the moving object by the device when the authentication is completed,
    wherein the authentication for the moving object is performed through the moving object and first nodes located within a predetermined range from the moving object.

2. The method of claim 1, wherein the method further comprises:
    performing, by the moving object and the first nodes, the data exchange through a first frame format based on a first type protocol.

3. The method of claim 2, wherein the method comprises:
    performing, by the device and the moving object, the data exchange with a cloud included in the fleet system through a second frame format based on a second type protocol.

4. The method of claim 3, wherein the data exchanged between the moving object and the first nodes based on the first type protocol comprises at least one of identification information, authentication information, or real-time processing information.

5. The method of claim 4, wherein the method comprises:
    when the cloud is not included in the fleet system, presetting the first type protocol and the first frame format to the device, the moving object, and the first nodes.

6. The method of claim 5, wherein the method comprises:
    when at least one of the identification information, the authentication information, or the real-time processing information is exchanged between the moving object and the first nodes based on the first type protocol, storing history information in at least one of the moving object or the device.

7. The method of claim 1, wherein the method further comprises:
    when the moving object and the first nodes share fleet authentication ledger information, performing the authentication for the moving object based on the fleet authentication ledger information.

8. The method of claim 7, wherein the method comprises:
    when the moving object receives a fleet request message from the device, performing the authentication based on the fleet request message.

9. The method of claim 8, wherein performing the authentication for the moving object further comprises:
    generating, by the moving object, authentication information based on the received fleet request message;
    transmitting the generated authentication information to the first nodes; and
    receiving first hash values from each of the first nodes, wherein each of the first hash values is generated by each of the first nodes based on the authentication information.

10. The method of claim 1, wherein searching for the available moving object further comprises:
    setting, by the moving object, a sharing condition; and
    searching for, by the device, the available moving object based on the set sharing condition.

11. The method of claim 10, wherein setting the sharing condition further comprises:
    setting the sharing condition based on at least one of use time information, movable area information, source information, or destination information of the moving object.

12. The method of claim 11, wherein the method comprises:
    transmitting, by the device, a fleet service request message including the sharing condition information to second nodes located within the predetermined range the device;
    the second nodes each generating, by the second nodes, a second hash value based on the fleet service request message; and
    when the authentication is completed based on the second hash value, providing, to the device, a candidate group list that satisfies the sharing condition information.

13. The method of claim 1, wherein the method comprises:
    setting the predetermined range to a coverage of a base station in which the moving object in included.

14. The method of claim 1, wherein the nodes located within the predetermined range are at least one of devices or moving objects registered in the fleet system.

15. A device for providing a moving object sharing service in a fleet system, the device comprising:
    a transceiver configured to transmit and receive a signal; and
    a processor configured to:
        control the transceiver;
        search for an available moving object; and
        perform authentication for the searched moving object,
        wherein when the authentication is completed, the moving object is controlled by the device, and
        wherein the authentication for the moving object is performed through the moving object and first nodes located within a predetermined range from the moving object.

16. The device of claim 15, wherein, when the moving object sets a sharing condition, the device is configured to search for the available moving object based on the condition.

17. The device of claim 16, wherein the sharing condition is set based on at least one of use time information, movable area information, source information, or destination information of the moving object.

18. The device of claim 17, wherein the processor is further configured to:
    transmit a fleet service request message including sharing condition information to second nodes located within a predetermined range from the device;
    control the second nodes to generate a second hash value based on the fleet service request message; and
    when the authentication is completed based on the second hash value, provide a candidate group list that satisfies the sharing condition information to the device.

19. The device of claim 18, wherein the processor is further configured to:
control the second nodes to generate the second hash value based on fleet search ledger information that is shared by the device and the second nodes based on the fleet system.

20. A fleet system for providing a moving object sharing service, the system comprising:
a plurality of devices registered in the fleet system; and
a plurality of moving objects registered in the fleet system,
wherein a first device of the plurality of devices is configured to search for an available moving object of the plurality of moving objects, and
wherein the first device is configured to:
perform authentication for the moving object;
control the moving object when the authentication is completed; and
perform the authentication of the moving object through the moving object and first nodes located within a predetermined range from the moving object.

* * * * *